(12) United States Patent
Zhao et al.

(10) Patent No.: US 8,993,977 B2
(45) Date of Patent: Mar. 31, 2015

(54) DETECTOR AND A METHOD FOR SIMULTANEOUSLY DETECTING BOTH GAMMA RAYS AND NEUTRON USING THE SAME

(71) Applicant: Nuctech Company Limited, Beijing (CN)

(72) Inventors: Kun Zhao, Beijing (CN); Ming Ruan, Beijing (CN)

(73) Assignee: Nuctech Company Limited, Beijing (CN)

( * ) Notice: Subject to any disclaimer, the term of this patent is extended or adjusted under 35 U.S.C. 154(b) by 0 days.

(21) Appl. No.: 14/366,899

(22) PCT Filed: Dec. 20, 2012

(86) PCT No.: PCT/CN2012/087021
§ 371 (c)(1),
(2) Date: Jun. 19, 2014

(87) PCT Pub. No.: WO2013/091554
PCT Pub. Date: Jun. 27, 2013

(65) Prior Publication Data
US 2014/0361187 A1  Dec. 11, 2014

(30) Foreign Application Priority Data
Dec. 22, 2011  (CN) .......................... 2011 1 0436139

(51) Int. Cl.
*G01T 3/06* (2006.01)
*G01T 1/16* (2006.01)
*G01T 1/17* (2006.01)

(52) U.S. Cl.
CPC ... *G01T 3/06* (2013.01); *G01T 1/16* (2013.01); *G01T 1/17* (2013.01)
USPC .................................................. 250/390.11

(58) Field of Classification Search
CPC ......................................................... G01T 3/06
USPC ............................ 250/390.01, 390.11, 482.1
See application file for complete search history.

(56) References Cited

U.S. PATENT DOCUMENTS

| 7,522,101 B2 | 4/2009 | Homiller et al. | |
| 7,633,058 B2 * | 12/2009 | Stoller et al. | 250/265 |
| 2006/0138345 A1 * | 6/2006 | Fehrenbacher | 250/482.1 |

FOREIGN PATENT DOCUMENTS

| CN | 101158656 A | 4/2008 |
| CN | 101329404 A | 12/2008 |
| CN | 1981211 B | 5/2011 |

(Continued)

OTHER PUBLICATIONS

PCT/CN2012/087021 International Search Report mailed Mar. 14, 2013, 3 pages.

*Primary Examiner* — David Porta
*Assistant Examiner* — Faye Boosalis
(74) *Attorney, Agent, or Firm* — Baker & Hostetler LLP

(57) ABSTRACT

The present invention discloses a detector. The detector includes a detector crystal, configured to detect incident rays therein; a plurality of moderator layers, configured to moderate neutrons entering the moderator layer; and a plurality of converter layers, configured to react with said moderated neutrons. The moderator layers and the converter layers are overlapped with each other, and the moderator layers and the converter layers are located outside the detector crystal.

10 Claims, 1 Drawing Sheet

(56) References Cited  * cited by examiner

FOREIGN PATENT DOCUMENTS

| CN | 102081166 A | 6/2011 |
| CN | 202372648 U | 8/2012 |

DETECTOR AND A METHOD FOR SIMULTANEOUSLY DETECTING BOTH GAMMA RAYS AND NEUTRON USING THE SAME

CROSS-REFERENCE TO RELATED APPLICATIONS

This application is the National Stage of International Application No. PCT/CN2012/087021, filed Dec. 20, 2012, which claims the benefit of Chinese Patent Application No. 201110436139.7, filed Dec. 22, 2011, the disclosures of which are incorporated herein by reference in their entireties.

BACKGROUND OF THE INVENTION

1. Field of the Invention

The present invention relates to a detector for monitoring radioactive substances, while detecting neutron and gamma rays.

2. Description of the Related Art $^3$He proportional counter tube is one of the most common neutron detectors. It is a preferred neutron detector in the fields such as neutron energy spectrum measurement, particular nuclear material monitoring, and radioactive material monitoring, due to the characteristic of high detection efficiency or the like.

However, $^3$He gas is a scarce resource and acquisition thereof is limited, so that the use of $^3$He proportional counter tube is limited. To this end, the present invention proposes a new neutron detection device and a measuring method thereof, and the detecting device in accordance with the present invention does not need $^3$He proportional counter tube.

SUMMARY OF THE INVENTION

In accordance with one aspect of the present invention, it provides a detector, comprising:

a detector crystal, configured to detect incident rays therein;

a plurality of moderator layers, configured to moderate neutrons entering the moderator layer; and a plurality of converter layers, configured to react with said moderated neutrons;

wherein the moderator layers and the converter layers are overlapped with each other, and the moderator layers and the converter layers are located outside the detector crystal.

Preferably, the moderator layer is made of polythene.
Preferably, the converter layer is made of copper or iron.
Preferably, the detector crystal is made of sodium iodide.
Preferably, each moderator layer has a thickness of 1-2 cm.
Preferably, each converter layer has a thickness of 1-4 mm.
Preferably, the detector crystal is cuboid, and the detector crystal has the same surface area as that of the moderator layer or the converter layer.

In accordance with another aspect of the present invention, it provides a method of simultaneously detecting neutrons and gamma rays, comprising the steps of:

using the detector of the present invention to detect the gamma rays;

processing output signals of the detector;

analyzing pulse height of said signals, to record neutron counts or gamma counts.

Preferably, if the energy is in a range of 3-8 MeV, then it is recorded as a neutron count; and if the energy is less than 3 MeV, then it is recorded as a gamma count.

Preferably, with respect to an energy analysis of a gamma region, if a characteristic peak is present within the gamma region, than it is recorded as a gamma count.

The above described non-speck embodiments at least have one or more aspects of the advantages and effects:

Compared with the prior art, constituting materials of the present detector are easy to be obtained, and reduce the cost. In addition, the present detector has a large application scope, and relatively high sensitivity.

DETAILED DESCRIPTION OF THE EMBODIMENTS

Figure 1:
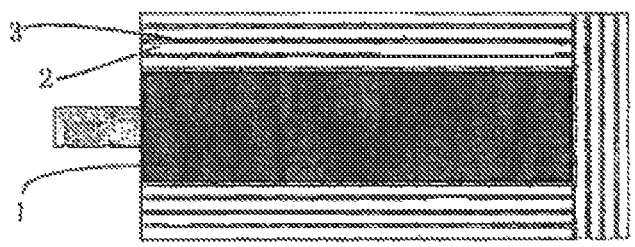
FIG. 1 is a sectional view of a front side of a detector in accordance with one embodiment of the present invention.

Technical solutions of the present invention will be described hereinafter in more detail by the way of embodiment with reference to FIGS. 1-2 of the attached drawings, wherein the same or like reference numerals refer to the same or like elements throughout the specification. The explanation to the embodiment of the present invention with referring to the accompanying drawings is intended to interpret the general inventive concept of the present invention, rather than being construed as a limiting to the present invention.

Figure 2:
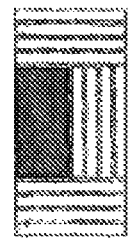
FIG. 2 is a cross-sectional side view of the detector as shown in FIG. 1.

In accordance with one preferred embodiment of the present invention, as shown in FIGS. 1 and 2, a detector includes a detector crystal 1, a multi-layer moderator or a plurality of moderator layers 2 and a multilayer converter or a plurality of converter layers 3. The moderator layer 2 is provided to moderate neutrons entering the moderator therein, and the converter layer 3 is provided to react with said moderated neutrons. The detector crystal 1 is arranged to detect incident rays therein. The moderator layers 2 overlap with the converter layers 3 each other, and the moderator layers 2 and the converter layers 3 are located outside the detector crystal 1. As shown in FIG. 1, the moderator layers 2 and the converter layers 3 surround the detector crystal 1.

In accordance with one preferred embodiment, the detector crystal is made of sodium iodide, and of course, alternatively can be made of cesium iodide or lanthanum bromide. The sodium iodide detector has high energy resolution. In addition, it is preferable for the moderator layer 2 to be made of polyethylene, since it is an ideal material for moderating neutron. Iron or copper is an element which has relatively large thermal neutron capture reaction cross-section (iron $\sigma_\gamma$=2.56 target, copper $\sigma_\gamma$=3.78 target). The iron or copper can react with thermal neutron to emit high-energy gamma rays. Preferably, the converter layer 3 is made of iron or copper.

As shown in FIG. 1, preferably, the detector crystal 1 is cuboid. The detector crystal 1 has the same surface area as that of the moderator layer 2 or the converter layer 3. Each moderator layer 2 has a thickness of 1-2 cm. Each converter layer 3 has a thickness of 1-4 mm. The detector crystal 1, the moderator layers 2 and the converter layers 3 are fixed together by a housing. Alternative arrangement of the moderator layers and the converter layers can increase the probability of the capture reaction.

The working principle of the present invention is as follows: the neutrons entering moderator 2 are firstly moderated and become low-enemy neutrons and subsequently, a portion of the low energy neutrons enter and react with converter layers 3 with a certain probability, and then gamma rays (the energy thereof is less than 8 MeV) are emitted. These gamma rays are detected by the detector and a signal thereof is processed and discriminated by a subsequent circuit. If the energy thereof is between 3 and 8 MeV, then it is recorded as a neutron count. Otherwise, with respect to the gamma rays entering the detector, a signal thereof is processed and discriminated by a subsequent circuit, and if the energy thereof is less than 3 MeV, then it is recorded as a gamma count (the gamma rays emitted from the gamma radioactive sources generally have energies less than 3 MeV).

In accordance with another aspect of the invention, the present invention also provides a method to simultaneously detect both neutrons and gamma rays. The detector of the present invention is used to detect the gamma rays. Signals from the detector are processed. The energies of the gamma rays are analysed to carry out the neutron counting and gamma ray counting.

Preferably, if the energy is in a range of 3 MeV to 8 MeV, then it is recorded as a neutron count; and if the energy is less than 3 MeV, then it is recorded as a gamma count.

For common gamma rays, the energies thereof are mostly less than 3 MeV. The output signals from the detector are divided into two regions. The one corresponding to energy less than 3 MeV is named as gamma region, in which the background count rate of gamma rays is very high. Another one corresponding to energy in the range of 3~8 MeV is named as neutron region, in which the background count rate of gamma rays is very low. For capture gamma ray with energy less than 3 MeV, although it will be counted into gamma region, the number thereof is much less than that of gamma background within this region. Therefore, this substantially will not cause a false alarm of the gamma region. For capture gamma ray with energy larger than 3 MeV, the number thereof is approximately equal to that of gamma background within this region, and this will cause an alarm of the neutron region. For non-capture gamma ray with energy less than 3 MeV, it will be counted into the gamma region. For the non-capture gamma ray with energy larger than 3 MeV, although it will be counted into the neutron region, this substantially will not cause a false alarm of the neutron region, due to a very small number thereof.

If a neutron source has very large activity, then capture gamma rays with energies less than 3 MeV will have a large number. Thus, this probably will cause false alarm of the gamma region. One solution to this problem is to perform an energy spectrum analysis of the gamma region. Since capture gamma ray has relatively scattered energy distribution, it is difficult to generate a characteristic peak on the energy spectrum within the gamma region. Even if a charactering peak is formed, it is also possible to determine whether the gamma rays are from neutron capture reaction, in accordance with a peak position thereof. When the alarm is triggered within the gamma region, if the characteristic peak cannot be found within the energy spectrum of the gamma region, then it indicates that said alarm is caused by the neutron source with large activity; if a characteristic peak exists within the enemy spectrum of the gamma region and belongs to a gamma radioactive source, then it indicates that this alarm is indeed caused by a gamma radioactive source.

Although some embodiments of the general inventive concept are illustrated and explained, it would be appreciated by those skilled in the art that is modifications and variations may be made in these embodiments without departing from the principles and spirit of the general inventive concept of the disclosure, the scope of which is defined in the appended claims and their equivalents.

What the claims is:

1. A detector, comprising:
    a detector crystal, configured to detect incident rays therein;
    a plurality of moderator layers, configured to moderate neutrons entering the moderator layer; and
    a plurality of converter layers, configured to act with said moderated neutrons;
    wherein the moderator layers and the converter layers are overlapped with each other, and the moderator layers and the converter layers are located outside the detector crystal.

2. The detector of claim 1, wherein the moderator layer is made of polythene.

3. The detector of claim 1, wherein the converter layer is made of copper or iron.

4. The detector of claim 1, wherein the detector crystal is made of sodium iodide.

5. The detector of claim 1, wherein each moderator layer has a thickness of 1-2 cm.

6. The detector of claim 1, wherein each converter layer has a thickness of 1-4 mm.

7. The detector of claim 1, wherein the detector crystal is cuboid, and the detect crystal has the same surface area as that of the moderator layer or the converter layer.

8. A method of simultaneously detecting neutrons and gamma rays, comprising:
    using a detector to detect the gamma rays, wherein the detector comprising:
        a detector crystal, configured to detect incident rays therein;
        a plurality of moderator layers, configured to moderate neutrons entering the moderator layer; and
        a plurality of converter layers, configured to act with said moderated neutrons;
        wherein the moderator layers and the converter layers are overlapped with each other, and the moderator layers and the converter layers are located outside the detector crystal;
    processing output signals of the detector;
    analysing pulse height of said signals, to record neutron counts or gamma counts.

9. The method of claim 8, wherein if the energy is in a range of 3-8 MeV, then it is recorded as a neutron count; and if the energy is less than 3 MeV, then it is recorded as a gamma count.

10. The method of claim 9, wherein with respect to an energy analysis of a gamma region, if a charactering peak is present within the gamma region, then it is recorded as a gamma count.

\* \* \* \* \*